No. 675,620. Patented June 4, 1901.
H. H. BUFFUM.
AUTOMOBILE GEARING.
(Application filed Dec. 17, 1900.)
(No Model.) 3 Sheets—Sheet 1.
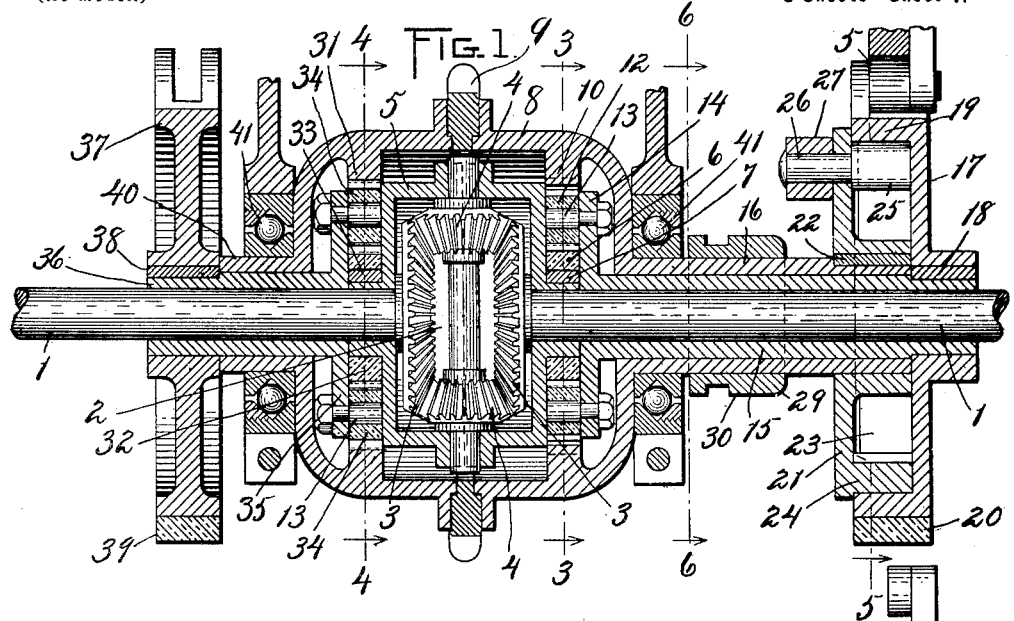
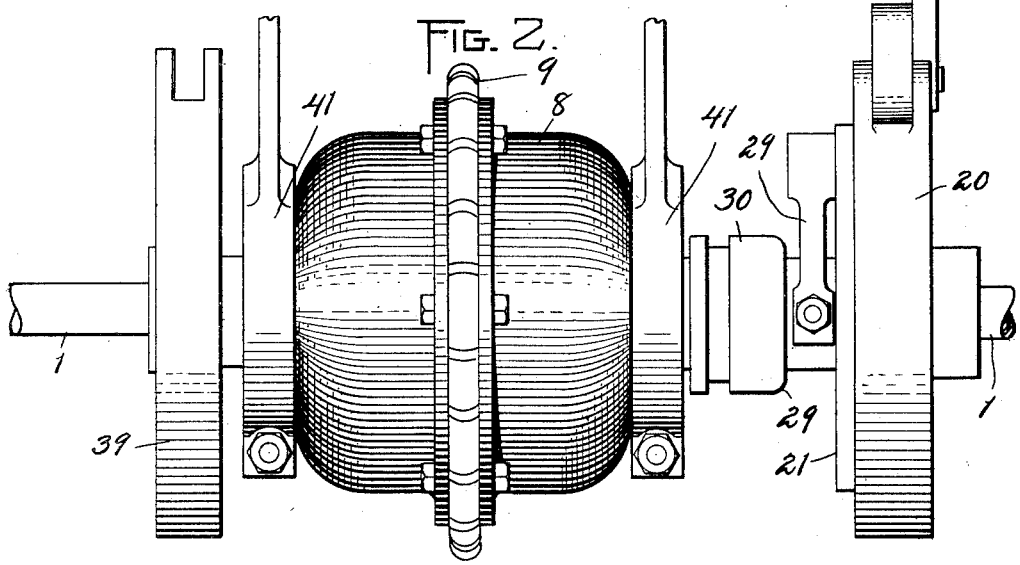
WITNESSES:
Fred E Dorr.
Walter P Abell.
INVENTOR:
H. H. Buffum
by Wright, Brown & Quinby
Attys.
THE NORRIS PETERS CO., PHOTO-LITHO., WASHINGTON, D. C.

No. 675,620. Patented June 4, 1901.
H. H. BUFFUM.
AUTOMOBILE GEARING.
(Application filed Dec. 17, 1900.)
(No Model.) 3 Sheets—Sheet 2.
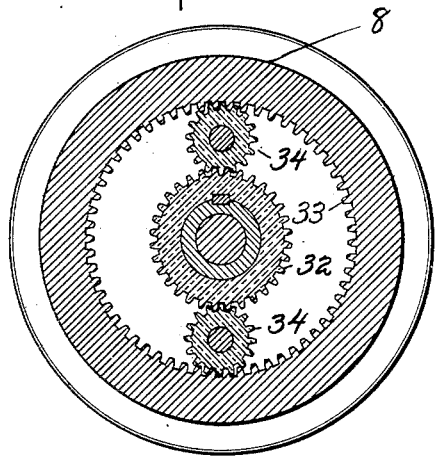
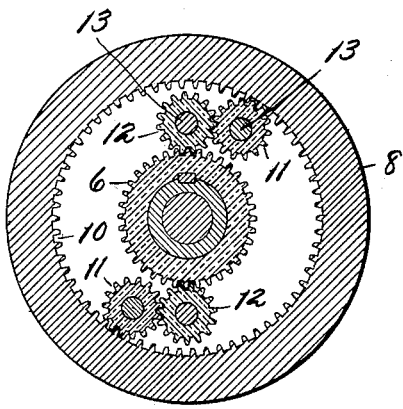
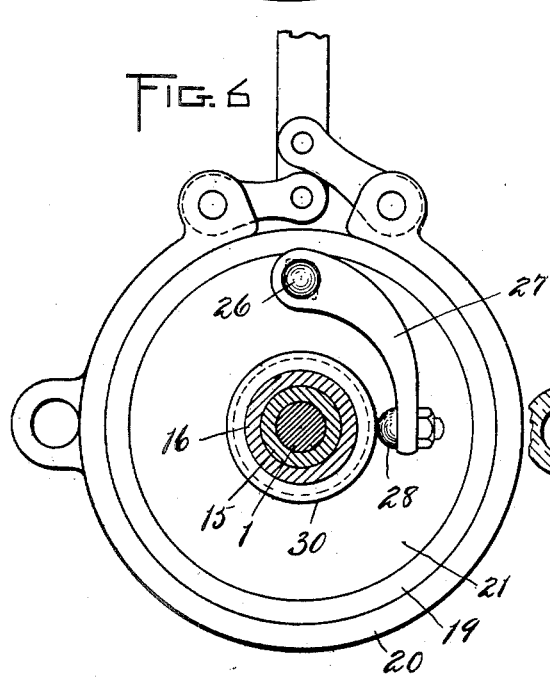
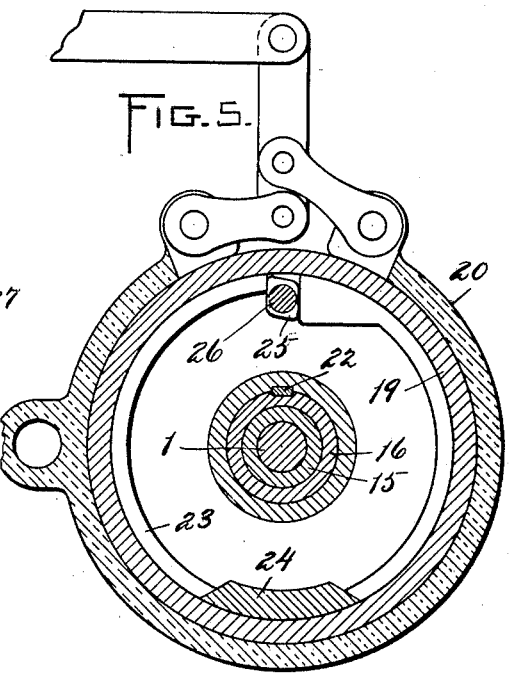
WITNESSES: INVENTOR:

No. 675,620. Patented June 4, 1901.
H. H. BUFFUM.
AUTOMOBILE GEARING.
(Application filed Dec. 17, 1900.)
(No Model.) 3 Sheets—Sheet 3.
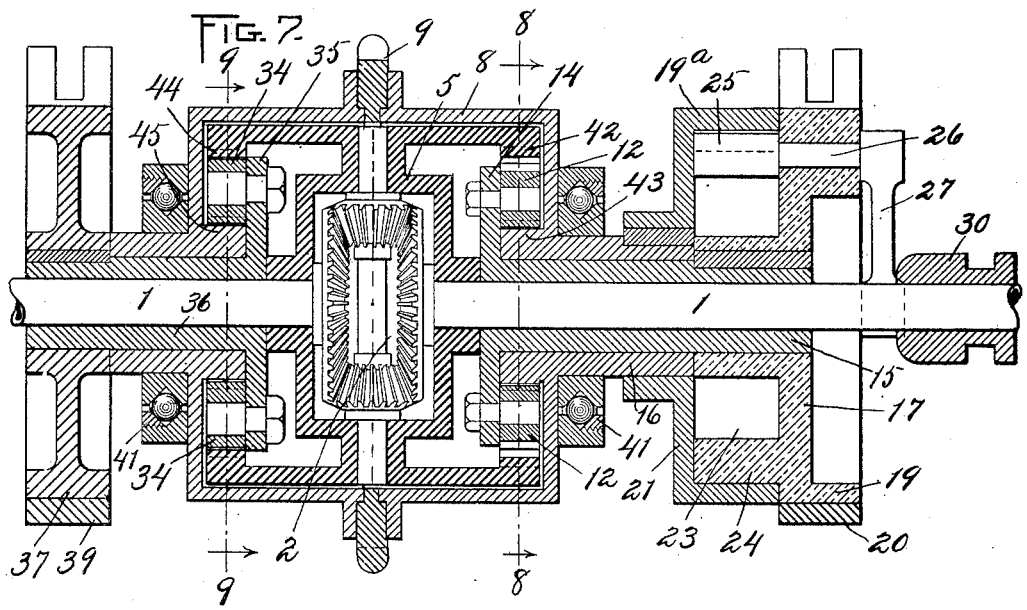

UNITED STATES PATENT OFFICE.

HERBERT H. BUFFUM, OF ABINGTON, MASSACHUSETTS.

AUTOMOBILE-GEARING.

SPECIFICATION forming part of Letters Patent No. 675,620, dated June 4, 1901.

Application filed December 17, 1900. Serial No. 40,112. (No model.)

*To all whom it may concern:*

Be it known that I, HERBERT H. BUFFUM, of Abington, in the county of Plymouth and State of Massachusetts, have invented certain new and useful Improvements in Automobile-Gearing, of which the following is a specification.

This invention relates to gearing for automobile vehicles, particularly those employing a unidirection-motor, said gearing having provisions for driving the vehicle ahead at different speeds, for reversing, and for disconnecting the motor from the driven axle.

The object of the invention is to render gearing of this character more simple and compact than heretofore, to dispense with counter-shafting, and to incase and protect the gearing.

The invention consists in certain novel features of construction and arrangement, which I shall now proceed to describe and claim.

Of the accompanying drawings, forming a part of this specification, Figure 1 represents an axial section through gearing constructed in accordance with my invention. Fig. 2 represents a rear elevation thereof. Figs. 3, 4, 5, and 6 represent sections on the correspondingly-numbered lines in Fig. 1. Fig. 7 represents a view corresponding to Fig. 1, showing another embodiment, which is the preferred construction. Figs. 8 and 9 represent sections on the correspondingly-numbered lines in Fig. 7.

The same reference characters indicate the same parts in all of the figures.

In the drawings, 1 1 represent the two driven axles of an automobile vehicle, and 2 represents the usual compensating gear connecting said axles, the same comprising the gears 3 3 on the ends of the axles, the intermediates or idlers 4, and the frame 5, in which the said idlers are mounted. By revolving the frame 5 in one direction or the other the axles 1 1 are correspondingly rotated and the vehicle is propelled forward or backward. The frame 5, as shown, has the form of a casing, with a bearing on both of the axles 1 1. On the right-hand hub of said frame 5 is affixed a gear 6 by means of a key 7.

8 is a casing adapted to be continuously propelled by the motor and having on its periphery a suitable driving member, such as the sprocket 9. The casing 8 is provided with an internal gear 10 concentric with the gear 6, and between the gears 10 and 6 is interposed planetary gearing 11 12.

In Fig. 3 two sets of planetary gears are shown, each comprising two intermeshing pinions interposed between the gears 6 10, whereby the rotation of the gear 10, if the planetary gears be held stationary, is transmitted to the gear 6 without change of direction. The gear 6 being smaller than gear 10 will be rotated at a higher speed than gear 10. The planetary gears 11 12 are journaled upon studs 13 13, affixed to a plate 14, which constitutes a carrier for the gears. Said plate is formed on the inner end of a sleeve 15, which loosely surrounds the right-hand axle 1. The casing 8 is provided with a sleeve 16, loosely surrounding the sleeve 15.

I provide two clutches, one for holding or releasing the carrier 14 and the other for locking together or unlocking the casing 8 and carrier 14. The former clutch, as shown, comprises a drum 17, having a web affixed by a key 18 to the outer end of a sleeve 15 and having a flange or clutch member 19 and a complemental member or band 20 stationarily mounted on the carriage-frame and adapted to grip the periphery of flange 19. The latter clutch comprises the inner side of flange 19 as one member, and a split spring-band located within the flange 19 and having a web or plate 21, affixed by a key 22 to the outer end of sleeve 16, as the other member. This band, as shown in Figs. 1 and 5, is separated from the plate 21 except at its lower point 24, and between its upper ends is interposed a double cam 25, secured to the end of a stud 26, journaled in the plate 21. Said stud has affixed to its outer end an arm 27, provided with a button 28 on its end, adapted to be engaged by a cam-shoulder 29 on a sleeve 30, adapted to slide longitudinally on the sleeve 16. Movement of this sleeve 30 toward the plate 21 oscillates the arm 27 and sets the band 23 out against the flange 19, thereby locking together the sleeves 15 and 16. Suitable connections are provided whereby the band 20 and sleeve 30 may be manipulated from the driver's seat on the carriage. With the above arrangement when it is desired to go ahead at a reduced speed the clutch 19 23 is set and the clutch 19 20 is left free. The casing 8 and carrier 14 being then locked together, relative rotation of the internal gear 10 and planetary gears 11 12 is prevented, and the gears 10, 11, 12, and 6 are therefore all locked together. The frame 5 then revolves at the same speed as the casing 8. To go ahead at an increased speed, the clutch 19 23 is thrown off and the clutch 19 20 is set. This arrests the rotation of the carrier 14, and the planetary gears 11 12 come into action to transmit the motion of the gear 10 to the gear 6, the latter and the frame 5 rotating at a higher speed than the gear 10. To stop the vehicle, both clutches are thrown out, and since the resistance to the rotation of the axles 1 is greater than the resistance to the rotation of the carrier 14 the latter will run loosely and will rotate backward without transmitting motion to the gear 6 and frame 5.

The reversing-gear is shown at the left of the compensating gear 2. It comprises elements similar to the go-ahead gear—namely, an internal gear 31 on the casing 8, a gear 32, affixed by a key 33 to the left-hand hub of the compensating-gear frame 5, planetary gears 34, connecting the gears 31 32, a carrier-plate 35 for said planetary gears, having sleeve 36 loosely surrounding the left-hand axle 1, and a clutch comprising a drum 37, secured by a key 38 to said sleeeve 36, and a stationary band 39, adapted to grip or release said drum and controlled by suitable connections from the driver's seat. There is, however, in this case only one planetary gear 34 in each set interposed between the gears 31 32, so that when the carrier 35 is held stationary the motion of the casing 8 will be transmitted in a reverse direction to gear 32 and the frame 5.

To run the vehicle backward, the two clutches 19 20 and 19 23 are released and the clutch 37 39 is set. This will prevent the carrier 35 from rotating, and the rotation of the casing 8 will cause the axles 1 to rotate backwardly. The casing 8 is provided on its left-hand end with a sleeve 40, loosely surrounding the sleeve 36. I show bearings 41 41, which are interposed between the sleeves 16 40 and the underframe or other superstructure of the carriage. The casing 8 is a frame which is made in closed or casing form, so as to inclose the compensating gear and its frame and the sets of planetary gears, together with the internal gears 10 31 and gears 6 32, with which they intermesh, and thereby to protect the said parts and prevent the entrance of dirt and moisture thereto.

Figs. 7, 8, and 9 illustrate a modified form of my invention, differing from that heretofore described in reversing the arrangement of the gears on the casing 8 and frame 5. In this case the frame 5 is provided with an internal gear 42 and the casing 8 with an external gear 43, of smaller size than said internal gear. When, therefore, the planetary-gear carrier 14 is held stationary, the casing 8 drives the frame 5 at a reduced speed instead of an increased speed. The highest speed of the axles 1 1 is then that which is due directly to the motor. The latter form of my invention is preferred on vehicles which use the high-speed gear most of the time, since it avoids wear on the gears. In the modification I have also shown the reversing mechanism as organized with an internal gear 44 on the frame 5 and an external gear 45 on the casing 8. Fig. 7 also shows a slightly-modified arrangement of the clutches at the right-hand side of the apparatus. In this case the stud 26, carrying the arm 27 and cam 25, is journaled in the web of drum 17, and said drum carries the split spring-band 23. The web or plate 21 has a flange $19^a$, against the inner side of which the band 23 acts.

The band-clutches 19 20 and 37 39 can be made to act as brakes for the vehicle, and in this instance it would be desirable to have a clutch at the motor whereby the motor may be thrown into or out of connection with the chain or gearing by which it drives the casing 8. As hereinbefore explained, when the clutch 19 23 is set the casing 8 is locked to the compensating-gear frame 5 through the medium of the planetary gears 11 12. If while the parts are thus locked the band 20 be applied to the drum 19 or the band 39 to the drum 37, a braking action will result, tending to arrest the rotation of the axles and stop the vehicle.

I claim—

1. In a power-transmitting gearing, the combination of two alined driven shafts, compensating gearing connecting the same and having a frame or case adapted, when rotated, to drive the shafts, an outer driving-casing inclosing said compensating gearing, two sets of differential gearing, for forward and reverse driving respectively, inclosed by said outer casing and connecting the same with the compensating-gear frame on opposite sides of said frame.

2. In a power-transmitting gearing, the combination of two alined driven shafts, compensating gearing connecting the same and having a frame or case adapted, when rotated, to drive the shafts, an outer driving member, differential gearing connecting said driving member with the compensating-gear frame, a sleeve controlling said differential gearing and surrounding the shaft, a clutch controlling said sleeve, and a bearing to connect the driving-gear to a vehicle-body, said bearing surrounding said sleeve between the compensating gearing and the clutch.

3. In a power-transmitting gearing, the combination of two alined driven shafts, compensating gearing connecting the same and having a frame or case adapted, when rotated, to drive the shafts, an outer driving member, two sets of differential gearing, for forward and reverse driving respectively, connecting said driving member with the compensating-gear frame on opposite sides of the latter, sleeves controlling said sets of gearing and surrounding the respective shafts, and clutches controlling the respective sleeves.

4. In a power-transmitting gearing, the combination of two alined driven shafts, compensating gearing connecting the same and having a frame or case adapted, when rotated, to drive the shafts, an outer driving member, two sets of differential gearing, for forward and reverse driving respectively, connecting said driving member with the compensating-gear frame on opposite sides of the latter, sleeves controlling said sets of gearing and surrounding the respective shafts, clutches controlling the respective sleeves, and bearings to connect the driving-gear to a vehicle-body, said bearings being located on opposite sides of the compensating gearing, between the latter and the respective clutches.

In testimony whereof I have affixed my signature in presence of two witnesses.

HERBERT H. BUFFUM.

Witnesses:
R. M. PIERSON,
H. L. ROBBINS.